(12) United States Patent
Yu et al.

(10) Patent No.: US 11,608,881 B2
(45) Date of Patent: Mar. 21, 2023

(54) LOCKING STRUCTURE OF DIFFERENTIAL

(71) Applicant: Jing-Jin Electric Technologies Co., Ltd., Beijing (CN)

(72) Inventors: Ping Yu, Beijing (CN); Yang Cao, Beijing (CN); Jianwen Li, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 17/371,986

(22) Filed: Jul. 9, 2021

(65) Prior Publication Data

US 2022/0349460 A1   Nov. 3, 2022

(30) Foreign Application Priority Data

Apr. 30, 2021   (CN) .......................... 202110480211.X

(51) Int. Cl.
*F16H 48/34*   (2012.01)
*F16H 48/24*   (2006.01)
(Continued)

(52) U.S. Cl.
CPC ............. *F16H 48/34* (2013.01); *F16H 48/24* (2013.01); *F16D 27/118* (2013.01); *F16H 48/08* (2013.01); *F16H 2048/346* (2013.01)

(58) Field of Classification Search
CPC .... F16H 48/24; F16H 48/34–2048/346; F16D 27/118
See application file for complete search history.

(56) References Cited

U.S. PATENT DOCUMENTS 4,955,853 A * 9/1990 Bausch ................... F16H 48/24
475/237
5,030,181 A * 7/1991 Keller ..................... F16H 48/30
192/84.92
(Continued)

FOREIGN PATENT DOCUMENTS

CN     112145576 A    12/2022
JP     2001041313 A    2/2001

OTHER PUBLICATIONS

Japanese Office Action for Application No. 2021-115793 dated Sep. 13, 2022.

*Primary Examiner* — Ernesto A Suarez
*Assistant Examiner* — James J Taylor, II
(74) *Attorney, Agent, or Firm* — Moser Taboada

(57) ABSTRACT

The present disclosure discloses a locking structure of a differential. The locking structure comprises a bi-stable electromagnetic clutch sleeved on an output axle shaft on one side of the differential. The bi-stable electromagnetic clutch comprises a movable locking disc and a fixed locking disc; the fixed locking disc is fixedly connected to a differential housing, and the movable locking disc and the fixed locking disc have face teeth that can engage with each other. The movable locking disc is sleeved on the output axle shaft, the bi-stable electromagnetic clutch drives the movable locking disc to move axially after being energized, the output axle shaft and the differential housing are locked when the movable face teeth engaged with the fixed face teeth so that the output axle shaft on either side of the differential and the differential housing have a same rotational speed and output torque.

8 Claims, 2 Drawing Sheets

(51) Int. Cl.
*F16D 27/118* (2006.01)
*F16H 48/08* (2006.01)

(56) References Cited

U.S. PATENT DOCUMENTS

| | | | | |
|---|---|---|---|---|
| 5,350,340 A | * | 9/1994 | Paul | F16H 48/08 475/237 |
| 11,142,067 B2 | * | 10/2021 | Creech | B60K 23/04 |
| 2008/0146353 A1 | * | 6/2008 | Boffelli | H02K 49/108 464/29 |
| 2017/0219023 A1 | | 8/2017 | Haupt et al. | |

* cited by examiner

LOCKING STRUCTURE OF DIFFERENTIAL

CROSS-REFERENCE TO RELATED APPLICATION

The current application claims priority to the Chinese Application No. 202110480211.X, filed on Apr. 30, 2021, which is incorporated herein by reference.

TECHNICAL FIELD

The present disclosure belongs to the technical field of differentials, and particularly relates to a locking structure of a differential.

BACKGROUND

The automobile differential is a mechanism that enables the left and right shafts to rotate at different speeds when the left wheel and right wheel have different load torque. It is mainly composed of left and right side sun gears, two planetary gears and a gear carrier. Its function is to make the left and right wheels roll at different speeds to balance two sides output torque of the wheels when the vehicle is turning or running on uneven roads. When the vehicle encounters muddy and very bad roads, it may happen that the tire on one side slips, and the tire on the other side does not rotate. However, due to the working principle of the differential, the same torque is allocated to the axle shafts on both sides of the differential, and thus the automobile does not have enough traction to get out of the predicament.

SUMMARY

In view of the above problems, the present invention discloses a locking structure of a differential to overcome the above problems or at least partially solve the above problems.

In order to achieve the above objectives, the present invention adopts the following technical solutions:

The present invention discloses a locking structure of a differential, comprising an electromagnetic clutch sleeved on an output axle shaft on one side of the differential, wherein the electromagnetic clutch comprises a movable locking disc and a fixed locking disc; the fixed locking disc is fixedly connected to a differential housing or integrated with a differential housing, and the movable locking disc and the fixed locking disc are respectively provided with movable face teeth and fixed face teeth that can engage with each other;

the movable locking disc is sleeved on the output axle shaft, the electromagnetic clutch drives the movable locking disc to move axially after being energized, the output axle shaft and the housing of the differential are locked when the movable face teeth engages with the fixed face teeth so that the output axle shaft on either side of the differential and the housing of the differential have a same rotational speed and same torque.

Further, the output axle shaft is provided with an external spline, and the movable locking disc is provided with an internal spline that fits with the external spline.

Further, the electromagnetic clutch is a bi-stable or bi-state electromagnetic clutch which is self-held by springs for a disengaged state or a magnet for an engaged state without being energized;

the bi-stable electromagnetic clutch is adapted to:

when the bi-stable electromagnetic clutch is in the engaged state holding by magnets, the movable face teeth and the fixed face teeth are in a disengaged state, the differential works normally, and when the electromagnetic clutch is in the disengaged state by springs, the movable face teeth engages with the fixed face teeth, and the output axle shaft and the housing of the differential are locked; or, when the bi-stable electromagnetic clutch is in the disengaged state holding by springs, the movable face teeth and the fixed face teeth are in a disengaged state, the differential works normally, and when the electromagnetic clutch is in the engaged state holding by magnets, the movable face teeth engages with the fixed face teeth, and the output axle shaft and the housing of the differential are locked.

Further, the locking structure further comprising a position sensor, wherein the position sensor is arranged outside of the movable locking disc to monitor the position of the movable locking disc and assess the state of the electromagnetic clutch.

Further, the electromagnetic clutch further comprises an armature disc, a yoke and an elastic member;

the armature disc carries with a number of magnets, the yoke carries with a number of cylindrical iron, and each of the cylindrical iron carries with a coil, consist a solenoid; the armature disc and the yoke are arranged correspondingly, and the cylindrical iron and the magnets are arranged correspondingly; the springs are arranged between the armature disc and the yoke to keep the armature disc and the yoke at a disengaged position;

a bearing is fixedly connected the movable locking disc and the armature disc. The armature has only axial displacement motion, the movable disc has both axial displacement motion and rotation motion with shaft or differential housing.

Further, the cylindrical iron and the magnets are presented individually or in a combined form;

the coils are connected in the following ways: parallel circuit, series circuit, or grouping series and parallel circuit.

Further, the cylindrical iron are distributed in the yoke, the cylindrical iron and the magnets are same in number and positioned in one-to-one correspondence.

Further, a top surface of the magnet is rectangular, square, triangular, circular or any other shape;

the armature disc carries with magnet grooves, and the magnets are fixed in the magnet grooves by gummed or plastic molding.

Further, the yoke carries with a limited pad, the limited pad is for positioning so as to keep a air gap between the magnets on armature and the cylindrical iron on yoke, the limited pad is also for damping and NVH.

Further, the fixed locking disc and the housing of the differential are fixedly connected by a screw or bolt; or, the fixed locking disc and the housing of the differential are manufactured integrally.

The advantages and beneficial effects of the present invention are as follows.

In the locking structure of the present invention, a bi-stable electromagnetic clutch is sleeved on the output axle shaft on one side of the differential, which can be hidden under the e-motor, reduce the impact of gearbox axial size. The bi-stable electromagnetic clutch comprises a movable locking disc that can slide axially on the output axle shaft and a fixed locking disc fixedly connected to the differential housing, or integrated with differential housing. The bi-stable electromagnetic clutch drives the movable locking disk to move axially after being energized. The output axle shaft and the differential housing are locked when the movable face teeth on the movable locking disk engages with the fixed face teeth on the fixed locking disc so that the output axle shaft on either side of the differential and the differential housing have a same rotational speed and output torque. The advantages of locking structure are bi-stable or bi-state, compact design, controllability, and a long service life.

BRIEF DESCRIPTION OF DRAWINGS

By reading the detailed description of the preferred embodiments below, various other advantages and benefits will become clear to a person of ordinary skill in the art. The drawings are only used for the purpose of illustrating the preferred embodiments, and should not be considered as a limitation to the present disclosure. Moreover, throughout the drawings, the same reference numerals are used to denote the same components. In the drawings.

Figure 1:
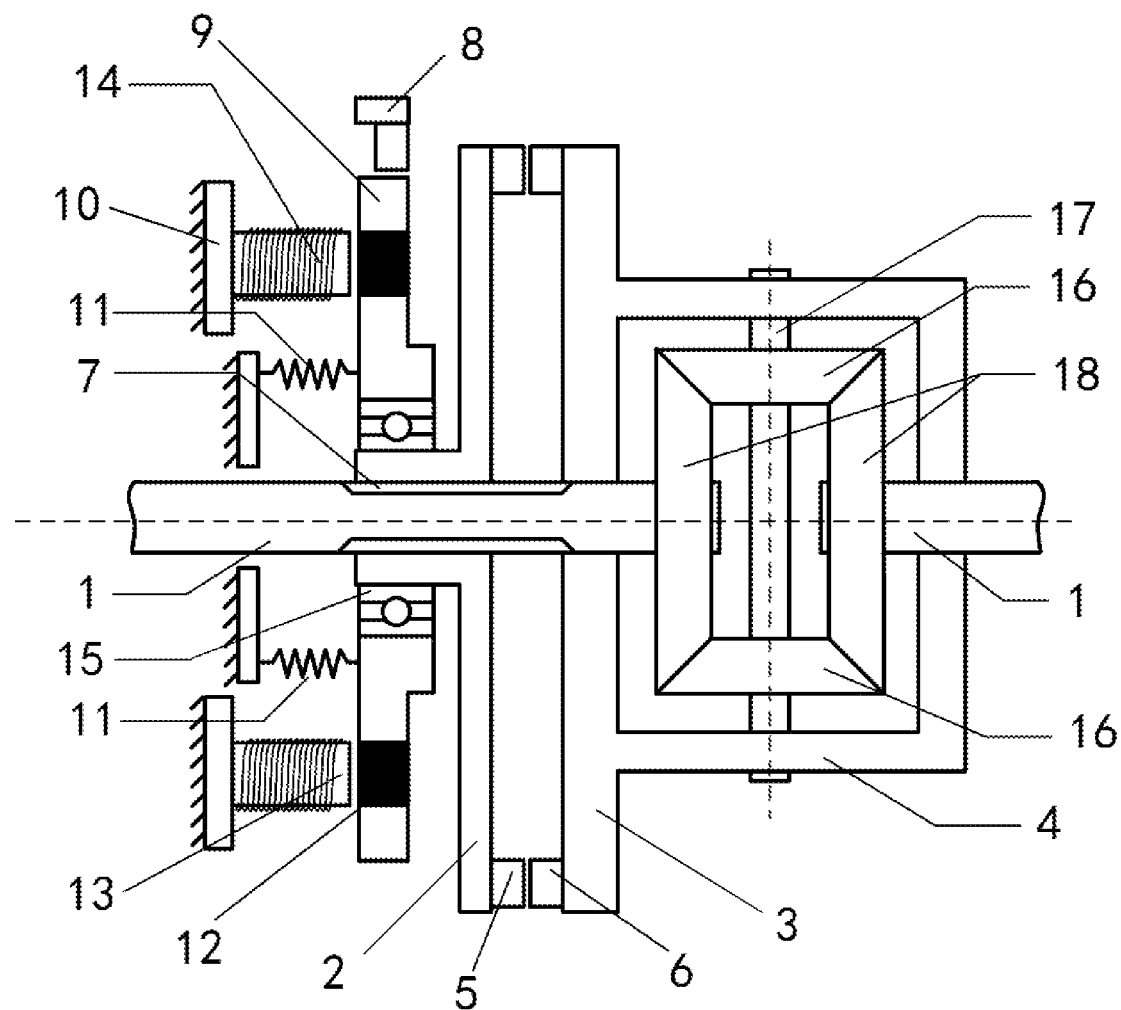
FIG. 1 is an axial cross-sectional view of a locking structure of a differential in an embodiment of the present invention.

In the drawings: 1. an output axle shaft; 2. a movable locking disk; 3. a fixed locking disk; 4. a differential housing; 5. movable face teeth; 6. fixed face teeth; 7. an external spline; 8. a position sensor; 9. an armature disc; 10. a yoke; 11. a spring; 12. a magnet; 13. a cylindrical iron; 14. a coil; 15. a bearing; 16. a planetary gear; 17. a planetary gear shaft; 18. a side sun gear.

DETAILED DESCRIPTION

In order to make the objectives, technical solutions, and advantages of the present disclosure clearer, the technical solutions of the present disclosure will be described clearly and completely in conjunction with specific embodiments of the present disclosure and corresponding drawings. Obviously, the embodiments described are only part of the embodiments of the present disclosure, rather than all of the embodiments. Based on the embodiments in the present disclosure, all other embodiments obtained by a person of ordinary skill in the art without paying creative work shall fall within the protection scope of the present disclosure.

The technical solutions according to the embodiments of the present disclosure will be described in detail below with reference to the accompanying drawings.

Figure 2:
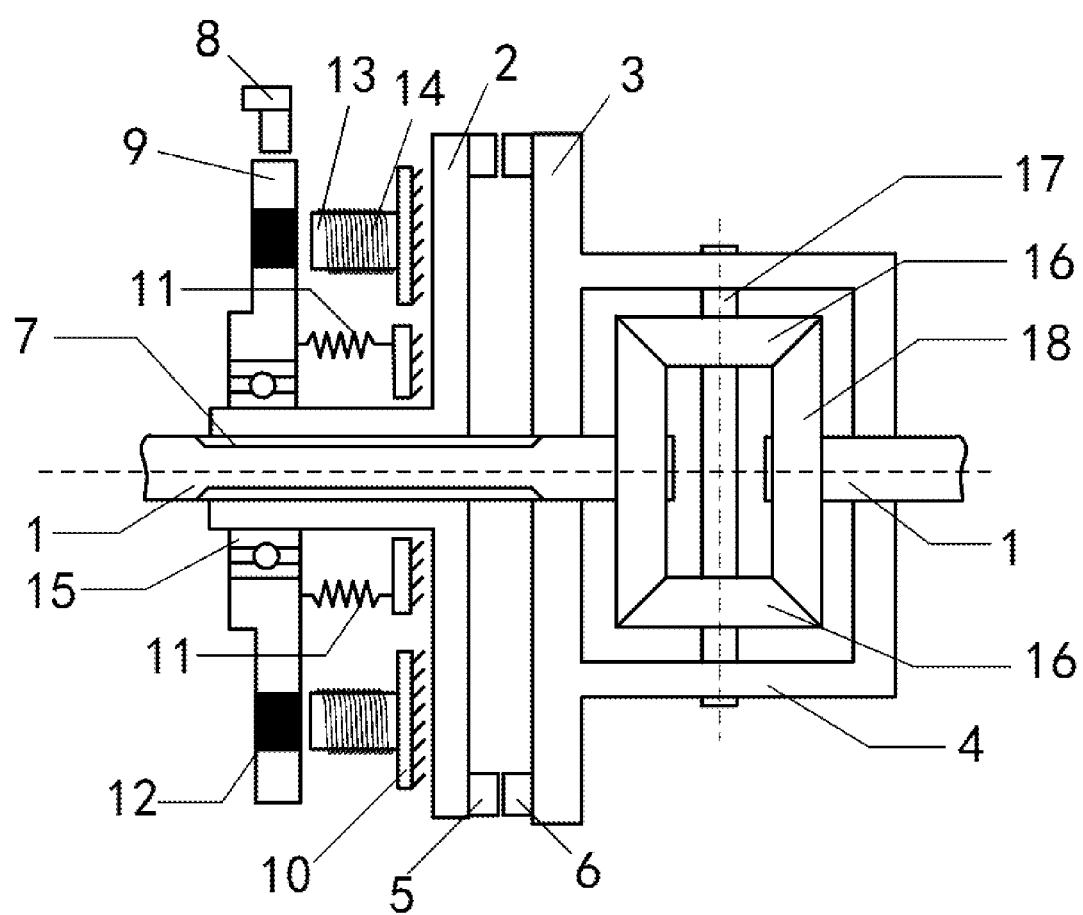
FIG. 2 is an axial cross-sectional view of another locking structure of a differential in an embodiment of the present invention.

An embodiment of the present invention discloses a locking structure of a differential. As shown in FIGS. 1-2, the locking structure comprises a electromagnetic clutch, and the specific type of the electromagnetic clutch is not limited. The electromagnetic clutch is sleeved on the output axle shaft 1 on one side of the differential. The output axle shaft can be either the left axle shaft or the right axle shaft. The left axle shaft and the right axle shaft may be connected to the left and right wheels of the vehicle respectively.

The differential comprises a differential housing 4, and two planetary gears 16 and two side sun gears 18 arranged in the differential housing 4. The two planetary gears 16 are sleeved on the planetary gear shaft 17. The two side sun gears 18 are sleeved on the two output axle shafts 1 respectively. The planetary gears 16 and the side sun gears 18 engage with each other.

Specifically, the electromagnetic clutch comprises a movable locking disc 2 and a fixed locking disc 3. The fixed locking disc 3 is sleeved on the output axle shaft 1 in a clearance fit, and is fixedly connected to the differential housing 4. The movable locking disc 2 and the fixed locking disc 3 are respectively provided with movable face teeth 5 and fixed face teeth 6 that can engage with each other.

The movable locking disc 2 is sleeved on the output axle shaft 1 and can slide axially, and can rotate synchronously with the output axle shaft 1. The electromagnetic attracting part of the electromagnetic clutch, after being energized, drives the movable locking disc 2 to move axially along the output axle shaft 1. The output axle shaft 1 and the differential housing 4 are locked when the movable face teeth 5 engaged with the fixed face teeth 6 so that the output axle shaft 1 on either side of the differential and the differential housing 4 have the same rotational speed.

Further, when the output axle shaft 1 on one side of the differential and the differential housing 4 are locked, the output axle shaft 1 and the planetary gear shaft 17 are relatively stationary. Due to the engaging effect of the planetary gear 16 and the side sun gear 18, the output axle shaft 1 on the other side and the planetary gear shaft 17 are also relatively stationary, so as to achieve the same rotation speed of the two output axle shafts 1.

In sum, the locking structure of this embodiment, by energizing the electromagnetic clutch, engages the movable face teeth 5 on the movable locking disc 2 with the fixed face teeth 6 on the fixed locking disc 3 to realize the relative fixation of the output axle shaft 1 and the differential housing 4, and can be uniformly stressed when the movable locking disk 2 moves in the axial direction and is engaged and fixed with the fixed locking disk 3, especially when the differential housing 4 drives the movable locking disk 2 and the fixed locking disk 3 to rotate at a high speed, and the locking structure is more stable and the service life is longer.

In addition, since the locking structure is controlled by the turning-on and turning-off of the electromagnetic clutch, it has good controllability.

In a preferred embodiment, as shown in FIGS. 1-2, the output axle shaft 1 is provided with an external spline 7, and the movable locking disc 2 is provided with an internal spline that fits with the external spline 7. The external spline 7 on the output axle shaft 1 may be a convex external spline or a concave external spline. When the outer spline 7 is a concave outer spline, one end of the output axle shaft 1 is thin, so that the movable locking disc 2 can be sleeved on the outer spline 7 more easily, and the synchronous rotation connection is more stable.

In a specific embodiment, the electromagnetic clutch is preferably a bi-stable electromagnetic clutch. The bi-stable electromagnetic clutch has a bi-stable or bi-state function, and is self-held by a spring or a magnet. It can achieve two states, namely, normally open and normally close without being energized, and maintain a disengaged state and an engaged state without consuming any form of energy.

The bi-stable electromagnetic clutch is adapted to:

as shown in FIG. 1, when the bi-stable electromagnetic clutch is in the engaged state, the movable face teeth 5 and the fixed face teeth 6 are in a disengaged state, the differential works normally, and the two output shafts 1 can achieve different rotation speeds. When the bi-stable electromagnetic clutch is energized in ae reverse direction and is in the disengaged state, the movable face teeth 5 and the fixed face teeth 6 engage, the output axle shaft 1 and the differential housing 4 are locked, and the two output axle shafts 1 are at the same rotation speed;

or, as shown in FIG. 2, when the bi-stable electromagnetic clutch is in the disengaged state, the movable face teeth 5 and the fixed face teeth 6 are in a disengaged state, the differential works normally, and the two output shafts 1 can achieve different rotation speeds. When the bi-stable electromagnetic clutch is energized and is in the engaged state, the movable face teeth 5 and the fixed face teeth 6 engaged, the output axle shaft 1 and the differential housing 4 are locked, and the two output axle shafts 1 are at the same rotation speed.

Since the bi-stable electromagnetic clutch does not need to be energized in the disengaged state and the engaged state, it consumes less energy, generates less heat, and has a long service life. Therefore, in the locking structure according to this embodiment, when the output shaft 1 and the differential housing 4 are operated to be locked, less energy is consumed, and the stability is good.

In a preferred embodiment, as shown in FIGS. 1-2, the locking structure further comprises a position sensor 8. The position sensor 8 is arranged outside of the movable locking disc to monitor a position of the movable locking disc 2 and assess a state of the bi-stable electromagnetic clutch. Even when the bi-stable electromagnetic clutch fails, the state of the bi-stable electromagnetic clutch can be determined by the position sensor 8. The position sensor 8 is preferably a photoelectric sensor, and may be arranged on the housing of the bi-stable electromagnetic clutch.

In one or some embodiments, as shown in FIGS. 1-2, the bi-stable electromagnetic clutch comprises an armature disc 9, a yoke 10, and a spring 11. The yoke 10 is fixedly connected to the housing of the bi-stable electromagnetic clutch. The armature disc 9 may be arranged between the yoke 10 and the movable locking disc 2, or may be arranged on the side of the yoke 10 away from the movable locking disc 2.

The armature disc 9 carries with a number of magnets 12. The yoke carries with a number of cylindrical iron 13. Each of the cylindrical iron 13 carries with a coil 14, consist a solenoid which can generate magnetic force when energized. The numbers of the cylindrical iron 13 and the magnets 12 can be set as required. The armature disc 9 and the yoke 10 are arranged correspondingly, and the axes of them are in a straight line. The cylindrical iron 13 and the magnets 12 are arranged correspondingly so that the cylindrical iron 13 and the magnets 12 can attract each other. The spring 11 is arranged between the armature disc 9 and the yoke 10 to keep the armature disc 9 and the yoke 10 at a disengaged position or an engaged position. One end of the spring 11 is connected with the armature disc 9, and the other end of the spring 11 is connected with the yoke 10 or the housing of the bi-stable electromagnetic clutch. The spring 11 is preferably a spring or a spring package.

A bearing 15 is fixedly connected the movable locking disc 2, and the armature disc 9 so that the armature disc 9 will not rotate with the rotation of the output axle shaft 1. The armature has only axial displacement motion, the movable disc has both axial displacement motion and rotation motion with shaft or differential housing.

In the present embodiment, a number of cylindrical iron 13 are arranged independently, which can make the magnetic induction line more concentrated and denser relative to the magnets 12, and the electric-magnetic conversion rate is higher. According to the principle of repulsion of same poles and attraction of different poles, there will be a great difference in electromagnetic force between the forward and reverse energization of the coils 14, so that the disengagement or engagement of the armature disc 9 and the yoke 10 are achieved.

Preferably, the cylindrical iron 13 and the magnets 12 are presented individually or in a combined form. The cylindrical iron 13 and the magnets 12 are uniformly or symmetrically distributed in an individual form. Of course, the cylindrical iron 13 and the magnets 12 may also be uniformly or symmetrically distributed in a combined form. For example, they are distributed in groups and each group includes two, or each group includes three to form a triangle.

The coils 14 are connected in the following manner: parallel circuit, series circuit, or grouping series and parallel circuit. The coils 14 may be connected in series. The coils 14 may also be connected in parallel. The coils 14 may also be connected in series and parallel, for example, multiple coils 14 are selected to be connected in series to form a group, and then several groups of coils 14 that have been connected in series are further connected in parallel.

In an embodiment, as shown in FIGS. 1-2, the cylindrical iron 13 are distributed in the yoke 10. The cylindrical iron 13 and the magnets 12 are same in number and positioned in one-to-one correspondence. The corresponding cylindrical iron 13 and magnet 12 are on the same axis, so as to facilitate the attracting between the cylindrical iron 13 and the magnet 12.

Preferably, the top surface of the magnet 12 is rectangular, square, triangular or circular. Of course, other shapes are also possible.

The armature disc 9 is provided with magnet grooves, and the magnets 12 are fixed in the magnet grooves by gummed or plastic molding. Of course, it may also be fixed by other means.

In an embodiment, a limited pad is provided on the outer circumference of the yoke 10. There may be multiple limited pads which may be arranged uniformly and/or symmetrically. The limited pad is for positioning so as to keep an air gap between the magnets on the armature and the cylindrical iron on the yoke 10. The limited pad is also for damping and NVH. On one hand, the limited pad can avoid direct impact between the armature disc 9 and the yoke 10 when the armature disc 9 and the yoke 10 are attracted. On the other hand, it ensures that there is a certain air gap between the magnets on armature and the cylindrical iron on the yoke 10 when the bi-stable electromagnetic clutch is engaged, so as to reduce the vibration generated during transmission.

In an embodiment, the fixed locking disc 3 and the differential housing 4 are fixedly connected by a screw or bolt.

In a preferred embodiment, as shown in FIGS. 1-2, the fixed locking disc 3 and the differential housing 4 are integrally manufactured, which makes the overall structure simpler while improving the strength of the fixed locking disc 3 and the differential housing 4.

The above description is only specific embodiments of the present disclosure. Based on the above teachings of the present disclosure, those skilled in the art can make other improvements or modifications on the basis of the above embodiments. Those skilled in the art should understand that the above specific description is only for better explaining the present disclosure, and the protection scope of the present disclosure should be subject to the protection scope of the claims.

What is claimed is:

1. A locking structure of a differential, comprising an electromagnetic clutch sleeved on an output axle shaft on one side of the differential, wherein the electromagnetic clutch comprises a movable locking disc and a fixed locking disc; the fixed locking disc is fixedly connected to a differential housing or integrated with the differential housing, and the movable locking disc and the fixed locking disc are respectively provided with movable face teeth and fixed face teeth that can engage with each other;

the movable locking disc is sleeved on the output axle shaft, the electromagnetic clutch drives the movable locking disc to move axially after being energized, the output axle shaft and the differential housing of the differential are locked when the movable face teeth engages with the fixed face teeth so that the output axle shaft on the one side of the differential and a second output axle shaft on the other side of the differential and the differential housing of the differential have a same rotational speed and same torque, the locking structure further comprises a position sensor, wherein the position sensor is arranged outside of the movable locking disc to monitor a position of the movable locking disc and assess a state of the electromagnetic clutch, the electromagnetic clutch further comprises an armature disc, a yoke and a spring;

the armature disc carries with a number of magnets, the yoke carries with a number of cylindrical irons, and each of the cylindrical irons carries with a coil; the armature disc and the yoke are arranged correspondingly, and the cylindrical irons and the magnets are arranged correspondingly; the spring is arranged between the armature disc and the yoke to keep the armature disc and the yoke at a disengaged position or at an engaged position;

a bearing is fixedly connected to the movable locking disc and the armature disc, the armature disc has only axial displacement motion, the movable locking disc has both axial displacement motion and rotation motion with the output axle shaft or the differential housing.

2. The locking structure according to claim 1, wherein the output axle shaft is provided with an external spline, and the movable locking disc is provided with an internal spline that fits with the external spline.

3. The locking structure according to claim 1, wherein the spring is one of a plurality of springs, wherein the electromagnetic clutch is a bi-stable or bi-state electromagnetic clutch which is self-held by the springs for a disengaged state or the magnets for an engaged state without being energized;

the bi-stable electromagnetic clutch is adapted to:

when the bi-stable electromagnetic clutch is in the engaged state holding by the magnets, the movable face teeth and the fixed face teeth are in a disengaged state, the differential works normally, and when the electromagnetic clutch is in the disengaged state by the springs, the movable face teeth engages with the fixed face teeth, and the output axle shaft and the differential housing of the differential are locked; or, when the bi-stable electromagnetic clutch is in the disengaged state holding by the springs, the movable face teeth and the fixed face teeth are in a disengaged state, the differential works normally, and when the electromagnetic clutch is in the engaged state holding by the magnets, the movable face teeth engages with the fixed face teeth, and the output axle shaft and the differential housing of the differential are locked.

4. The locking structure according to claim 1, wherein the cylindrical irons and the magnets are presented individually or in a combined form;and the coils are connected in the following ways: parallel circuit, series circuit, or grouping series and parallel circuit.

5. The locking structure according to claim 1, wherein the cylindrical irons are distributed in the yoke, the cylindrical irons and the magnets are same in number and positioned in one-to-one correspondence.

6. The locking structure according to claim 1, wherein a top surface of each magnet is rectangular, square, triangular, circular or any other shape; and the armature disc is provided with magnet grooves, and the magnets are fixed in the magnet grooves by gummed or plastic molding.

7. The locking structure according to claim 1, wherein the yoke is provided with a limited pad, the limited pad is for positioning so as to keep an air gap between the magnets on the armature disc and the cylindrical irons on the yoke, the limited pad is also for damping and NVH.

8. The locking structure according to claim 1, wherein the fixed locking disc and the differential housing of the differential are fixedly connected by a screw or bolt; or the fixed locking disc and the differential housing of the differential are manufactured integrally.

* * * * *